(12) United States Patent
Srinivasan et al.

(10) Patent No.: US 7,933,337 B2
(45) Date of Patent: Apr. 26, 2011

(54) PREDICTION OF TRANSFORM COEFFICIENTS FOR IMAGE COMPRESSION

(75) Inventors: Sridhar Srinivasan, Redmond, WA (US); Chengjie Tu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1516 days.

(21) Appl. No.: 11/203,009

(22) Filed: Aug. 12, 2005

(65) Prior Publication Data

US 2007/0036224 A1 Feb. 15, 2007

(51) Int. Cl.
*H04N 7/12* (2006.01)
*H04N 11/02* (2006.01)
*H04N 11/04* (2006.01)

(52) U.S. Cl. .................. 375/240.18; 382/233; 382/232; 375/240.15

(58) Field of Classification Search ............. 375/240.18; 382/233
See application file for complete search history.

(56) References Cited

U.S. PATENT DOCUMENTS

| | | |
|---|---|---|
| 4,420,771 A | 12/1983 | Pirsch |
| 4,698,672 A | 10/1987 | Chen |
| 4,730,348 A | 3/1988 | MacCrisken |
| 4,792,981 A | 12/1988 | Cahill et al. |
| 4,813,056 A | 3/1989 | Fedele |
| 4,901,075 A | 2/1990 | Vogel |
| 4,968,135 A | 11/1990 | Wallace et al. |
| 5,043,919 A | 8/1991 | Callaway et al. |
| 5,089,818 A | 2/1992 | Mahieux et al. |
| 5,109,451 A | 4/1992 | Aono et al. |
| 5,128,758 A | 7/1992 | Azadegan |
| 5,146,324 A | 9/1992 | Miller et al. |
| 5,179,442 A | 1/1993 | Azadegan |
| 5,227,788 A | 7/1993 | Johnston |
| 5,227,878 A | 7/1993 | Puri et al. |
| 5,266,941 A | 11/1993 | Akeley et al. |
| 5,270,832 A | 12/1993 | Balkanski et al. |
| 5,376,968 A | 12/1994 | Wu et al. |
| 5,381,144 A | 1/1995 | Wilson et al. |

(Continued)

FOREIGN PATENT DOCUMENTS

EP 0 540 350 5/1993

(Continued)

OTHER PUBLICATIONS

Bell et al., "Text Compression," *Prentice Hall*, pp. 105-107, 1990.

(Continued)

*Primary Examiner* — Joseph G Ustaris
*Assistant Examiner* — James Pontius
(74) *Attorney, Agent, or Firm* — Klarquist Sparkman, LLP

(57) ABSTRACT

A block transform-based digital media codec uses a transform coefficient prediction that takes into account a dominant directionality of the digital media data (e.g., an image with strong horizontal or vertical features), and further operates compatibly with a two-stage transform. For DC and DCAC coefficients from an inner stage transform of a macroblock, the codec calculates and compares directionality metrics based on inner stage transform DC coefficients of neighboring macroblocks to determine dominant directionality. For DCAC coefficients from an outer stage transform of blocks within the macroblock, the codec calculates and compares directionality metrics based on the inner stage transform DCAC coefficients of the macroblock to detect dominant directionality. The determination of directional dominance can also take into account information from other channels (e.g., chrominance as well as luminance).

30 Claims, 12 Drawing Sheets

U.S. PATENT DOCUMENTS

| | | | |
|---|---|---|---|
| 5,394,170 A | 2/1995 | Akeley et al. | |
| 5,400,075 A | 3/1995 | Savatier | |
| 5,408,234 A | 4/1995 | Chu | |
| 5,457,495 A | 10/1995 | Hartung | |
| 5,461,421 A | 10/1995 | Moon | |
| 5,467,134 A | 11/1995 | Laney | |
| 5,481,553 A | 1/1996 | Suzuki | |
| 5,493,407 A | 2/1996 | Takahara | |
| 5,504,591 A | 4/1996 | Dujari | |
| 5,508,816 A | 4/1996 | Ueda et al. | |
| 5,533,140 A | 7/1996 | Sirat et al. | |
| 5,535,305 A | 7/1996 | Acero et al. | |
| 5,544,286 A | 8/1996 | Laney | |
| 5,559,557 A | 9/1996 | Kato et al. | |
| 5,568,167 A | 10/1996 | Galbi et al. | |
| 5,574,449 A | 11/1996 | Golin | |
| 5,579,430 A | 11/1996 | Grill et al. | |
| 5,592,584 A | 1/1997 | Ferreira et al. | |
| 5,627,938 A | 5/1997 | Johnston | |
| 5,654,706 A | 8/1997 | Jeong et al. | |
| 5,661,755 A | 8/1997 | Van de Kerkhof | |
| 5,664,057 A | 9/1997 | Crossman et al. | |
| 5,714,950 A | 2/1998 | Jeong et al. | |
| 5,717,821 A | 2/1998 | Tsutsui | |
| 5,732,156 A | 3/1998 | Watanabe et al. | |
| 5,748,789 A | 5/1998 | Lee et al. | |
| 5,793,897 A | 8/1998 | Jo et al. | |
| 5,802,213 A | 9/1998 | Gardos | |
| 5,812,971 A | 9/1998 | Herre | |
| 5,819,215 A | 10/1998 | Dobson et al. | |
| 5,825,830 A | 10/1998 | Kopf | |
| 5,825,979 A | 10/1998 | Tsutsui et al. | |
| 5,828,426 A | 10/1998 | Yu | |
| 5,831,559 A | 11/1998 | Agarwal et al. | |
| 5,835,144 A | 11/1998 | Matsumura | |
| 5,844,508 A | 12/1998 | Murashita et al. | |
| 5,850,482 A | 12/1998 | Meany et al. | |
| 5,883,633 A | 3/1999 | Gill et al. | |
| 5,884,269 A | 3/1999 | Cellier et al. | |
| 5,889,891 A | 3/1999 | Gersho et al. | |
| 5,896,176 A * | 4/1999 | Das et al. | 375/240.15 |
| 5,946,043 A | 8/1999 | Lee et al. | |
| 5,959,674 A | 9/1999 | Jang et al. | |
| 5,969,650 A | 10/1999 | Wilson et al. | |
| 5,974,184 A | 10/1999 | Eifrig et al. | |
| 5,974,380 A | 10/1999 | Smyth et al. | |
| 5,982,437 A | 11/1999 | Okazaki | |
| 5,983,172 A | 11/1999 | Takashima et al. | |
| 5,990,960 A | 11/1999 | Murakami | |
| 5,991,451 A | 11/1999 | Keith et al. | |
| 5,995,670 A | 11/1999 | Zabinsky | |
| 6,002,439 A | 12/1999 | Murakami | |
| 6,026,195 A | 2/2000 | Eifrig et al. | |
| 6,038,536 A | 3/2000 | Haroun et al. | |
| 6,041,302 A | 3/2000 | Bruekers | |
| 6,049,630 A | 4/2000 | Wang et al. | |
| 6,054,943 A | 4/2000 | Lawrence | |
| 6,078,691 A | 6/2000 | Luttmer | |
| 6,097,759 A | 8/2000 | Murakami | |
| 6,097,880 A | 8/2000 | Koyata | |
| 6,100,825 A | 8/2000 | Sedluk | |
| 6,111,914 A | 8/2000 | Bist | |
| 6,148,109 A | 11/2000 | Boon | |
| 6,154,572 A | 11/2000 | Chaddha | |
| 6,173,080 B1 | 1/2001 | Cho et al. | |
| 6,195,465 B1 | 2/2001 | Zandi et al. | |
| 6,205,256 B1 | 3/2001 | Chaddha | |
| 6,215,910 B1 | 4/2001 | Chaddha | |
| 6,223,162 B1 | 4/2001 | Chen | |
| 6,226,407 B1 | 5/2001 | Zabih et al. | |
| 6,233,017 B1 | 5/2001 | Chaddha | |
| 6,253,165 B1 | 6/2001 | Malvar | |
| 6,259,810 B1 | 7/2001 | Gill et al. | |
| 6,272,175 B1 | 8/2001 | Sriram et al. | |
| 6,292,588 B1 | 9/2001 | Shen | |
| 6,300,888 B1 | 10/2001 | Chen | |
| 6,304,928 B1 | 10/2001 | Mairs et al. | |
| 6,337,881 B1 | 1/2002 | Chaddha | |
| 6,341,165 B1 | 1/2002 | Gbur | |
| 6,345,123 B1 | 2/2002 | Boon | |
| 6,349,152 B1 | 2/2002 | Chaddha | |
| 6,360,019 B1 | 3/2002 | Chaddha | |
| 6,377,930 B1 | 4/2002 | Chen | |
| 6,392,705 B1 | 5/2002 | Chaddha | |
| 6,404,931 B1 | 6/2002 | Chen | |
| 6,408,029 B1 | 6/2002 | McVeigh et al. | |
| 6,420,980 B1 | 7/2002 | Ejima | |
| 6,421,738 B1 | 7/2002 | Ratan et al. | |
| 6,441,755 B1 | 8/2002 | Dietz et al. | |
| 6,477,280 B1 | 11/2002 | Malvar | |
| 6,487,535 B1 | 11/2002 | Smyth et al. | |
| 6,493,385 B1 | 12/2002 | Sekiguchi et al. | |
| 6,542,631 B1 | 4/2003 | Ishikawa | |
| 6,542,863 B1 | 4/2003 | Surucu | |
| 6,567,781 B1 | 5/2003 | Lafe | |
| 6,573,915 B1 | 6/2003 | Sivan et al. | |
| 6,580,834 B2 | 6/2003 | Li et al. | |
| 6,587,057 B2 | 7/2003 | Scheuermann | |
| 6,608,935 B2 * | 8/2003 | Nagumo et al. | 382/233 |
| 6,636,168 B2 | 10/2003 | Ohashi et al. | |
| 6,646,578 B1 | 11/2003 | Au | |
| 6,650,784 B2 | 11/2003 | Thyagarajan | |
| 6,678,419 B1 | 1/2004 | Malvar | |
| 6,683,980 B1 | 1/2004 | Meier et al. | |
| 6,704,360 B2 | 3/2004 | Haskell et al. | |
| 6,721,700 B1 | 4/2004 | Yin | |
| 6,728,317 B1 | 4/2004 | Demos | |
| 6,766,293 B1 | 7/2004 | Herre | |
| 6,771,777 B1 | 8/2004 | Gbur | |
| 6,795,584 B2 | 9/2004 | Karczewicz et al. | |
| 6,825,847 B1 | 11/2004 | Molnar et al. | |
| 6,829,299 B1 | 12/2004 | Chujoh et al. | |
| 6,925,249 B1 | 8/2005 | Meier et al. | |
| 6,934,677 B2 | 8/2005 | Chen et al. | |
| 7,016,547 B1 | 3/2006 | Smirnov | |
| 7,107,212 B2 | 9/2006 | Van Der Vleuten et al. | |
| 7,139,703 B2 | 11/2006 | Acero et al. | |
| 7,165,028 B2 | 1/2007 | Gong | |
| 7,305,174 B2 | 12/2007 | Meier et al. | |
| 7,492,950 B2 * | 2/2009 | Suzuki et al. | 382/232 |
| 7,565,018 B2 | 7/2009 | Srinivasan | |
| 2002/0009145 A1 | 1/2002 | Natarajan et al. | |
| 2002/0111780 A1 | 8/2002 | Sy | |
| 2003/0006917 A1 | 1/2003 | Ohashi et al. | |
| 2003/0033143 A1 | 2/2003 | Aronowitz | |
| 2003/0085822 A1 | 5/2003 | Scheuermann | |
| 2003/0115055 A1 | 6/2003 | Gong | |
| 2003/0138150 A1 | 7/2003 | Srinivasan | |
| 2003/0156648 A1 | 8/2003 | Holcomb et al. | |
| 2003/0210163 A1 | 11/2003 | Yang | |
| 2004/0044521 A1 | 3/2004 | Chen et al. | |
| 2004/0044534 A1 | 3/2004 | Chen et al. | |
| 2004/0049379 A1 | 3/2004 | Thumpudi et al. | |
| 2004/0114810 A1 | 6/2004 | Boliek | |
| 2004/0136457 A1 | 7/2004 | Funnell et al. | |
| 2004/0184537 A1 | 9/2004 | Geiger et al. | |
| 2005/0015249 A1 | 1/2005 | Mehrotra et al. | |
| 2005/0021317 A1 | 1/2005 | Weng et al. | |
| 2005/0052294 A1 | 3/2005 | Liang et al. | |
| 2008/0198933 A1 | 8/2008 | Srinivasan et al. | |

FOREIGN PATENT DOCUMENTS

| | | |
|---|---|---|
| EP | 0 645 930 | 3/1995 |
| EP | 0 910 927 | 1/1998 |
| EP | 0 833 520 A2 | 4/1998 |
| EP | 0 966 793 | 9/1998 |
| EP | 0 931 386 | 1/1999 |
| EP | 1 142 130 | 4/2003 |
| EP | 1 400 954 | 3/2004 |
| EP | 1 142 129 | 6/2004 |
| EP | 1 465 431 | 10/2004 |
| GB | 2341031 | 3/2000 |
| GB | 2 372 918 | 9/2002 |
| GB | 2 388 502 | 11/2003 |
| JP | 3-60293 | 3/1991 |
| JP | 5-292481 | 11/1993 |
| JP | 6-021830 | 1/1994 |

| | | |
|---|---|---|
| JP | 6-217110 | 8/1994 |
| JP | 7-274171 | 10/1995 |
| JP | 2000-23193 | 1/2000 |
| JP | 2002 204170 | 7/2002 |
| RU | 2119727 | 9/1998 |
| RU | 2123769 | 12/1998 |
| WO | WO 98/00924 | 1/1998 |

OTHER PUBLICATIONS

Davis, "The AC-3 Multichannel Coder," *Dolby Laboratories Inc.*, Audio Engineering Study, Inc., Oct. 1993.
U.S. Appl. No. 60/341,674, filed Dec. 2001, Lee et al.
U.S. Appl. No. 60/488,710, filed Jul. 2003, Srinivasan et al.
Advanced Television Systems Committee, "ATSC Standard: Digital Audio Compression (AC-3), Revision A," 140 pp. (1995).
Bosi et al., "ISO/IEC MPEG-2 Advance Audio Coding," J. Audio Eng. Soc., vol. 45, No. 10, pp. 789-812 (1997).
Brandenburg, "ASPEC Coding," *AES 10th International Conference*, pp. 81-90 (1991).
Chiang et al., "A Radix-2 Non-Restoring 32-b/32-b Ring Divider with Asynchronous Control Scheme," Tamkang Journal of Science and Engineering, vol. 2, No. 1, pp. 37-43 (1999).
Chung et al., "A Novel Memory-efficient Huffman Decoding Algorithm and its Implementation," Signal Processing 62, pp. 207-213 (1997).
Cui et al., "A novel VLC based on second-run-level coding and dynamic truncation," *Proc. SPIE*, vol. 6077, pp. 607726-1 to 607726-9 (2006).
De Agostino et al., "Parallel Algorithms for Optimal Compression using Dictionaries with the Prefix Property," *Proc. Data Compression Conference '92, IEEE Computer Society Press*, pp. 52-62 (1992).
Gailly, "comp.compression Frequently Asked Questions (part 1/3)," 64 pp., document marked Sep. 5, 1999 [Downloaded from the World Wide Web on Sep. 5, 2007].
Gersho et al., "Vector Quantization and Signal Compression," pp. 259-305 (1992).
Gibson et al., *Digital Compression for Multimedia*, "Chapter 2: Lossless Source Coding," Morgan Kaufmann Publishers, Inc., San Francisco, pp. 17-61 (1998).
Gibson et al., *Digital Compression for Multimedia*, "Chapter 7: Frequency Domain Coding," Morgan Kaufmann Publishers, Inc., pp. 227-262 (1998).
Gill et al., "Creating High-Quality Content with Microsoft Windows Media Encoder 7," 4 pp. (2000) [Downloaded from the World Wide Web on May 1, 2002].
Hui et al., "Matsushita Algorithm for Coding of Moving Picture Information," ISO/IEC-JTC1/SC29/WG11, MPEG91/217, 76 pp. (Nov. 1991).
International Search Report and Written Opinion for PCT/US06/30563, dated Oct. 17, 2007, 8 pages.
International Search Report and Written Opinion for PCT/US06/30566 dated Sep. 28, 2007.
Ishii et al., "Parallel Variable Length Decoding with Inverse Quantization for Software MPEG-2 Decoders," IEEE Signal Processing Systems, pp. 500-509 (1997).
ISO/IEC, "ISO/IEC 11172-2, Information Technology—Coding of Moving Pictures and Associated Audio for Digital Storage Media at up to About 1.5 Mbit/s—Part 2: Video," 112 pp. (1993).
"ISO/IEC 11172-3, Information Technology—Coding of Moving Pictures and Associated Audio for Digital Storage Media at Up to About 1.5 Mbit/s—Part 3: Audio," 154 pp. (1993).
"ISO/IEC 13818-7, Information Technology—Generic Coding of Moving Pictures and Associated Audio Information—Part 7: Advanced Audio Coding (AAC)," 174 pp. (1997).
ISO/IEC, "JTC1/SC29/WG11 N2202, Information Technology—Coding of Audio-Visual Objects: Visual, ISO/IEC 14496-2," 329 pp. (1998).
ITU-T, "ITU-T Recommendation H.261, Video Codec for Audiovisual Services at p×64 kbits," 25 pp. (1993).
ITU-T, "ITU-T Recommendation H.262, Information Technology—Generic Coding of Moving Pictures and Associated Audio Information: Video," 205 pp. (1995).
ITU-T, "ITU-T Recommendation H.263, Video coding for low bit rate communication," 162 pp. (1998).
Jeong et al., "Adaptive Huffman Coding of 2-D DCT Coefficients for Image Sequence Compression," *Signal Processing: Image Communication*, vol. 7, 11 pp. (1995).
Joint Video Team (JVT) of ISO/IEC MPEG & ITU-T VCEG, "Joint Final Committee Draft (JFCD) of Joint Video Specification," JVT-D157, 207 pp. (Aug. 2002).
Joint Video Team (JVT) of ISO/IEC MPEG & ITU-T VCEG, "Draft ITU-T Recommendation and Final Draft International Standard of Joint Video Specification (ITU-T Rec. H.264, ISO/IEC 14496-10 AVC)," 253 pp. (May 2003).
Li et al., "Optimal Linear Interpolation Coding for Server-Based Computing," *Proc. IEEE Int'l Conf. on Communications*, 5 pp. (Apr.-May 2002).
Matthias, "An Overview of Microsoft Windows Media Screen Technology," 3 pp. (2000) [Downloaded from the World Wide Web on May 1, 2002].
Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].
Mook, "Next-Gen Windows Media Player Leaks to the Web," *BetaNews*, 18 pp. (Jul. 2002) [Downloaded from the World Wide Web on Mar. 16, 2004].
Najafzadeh-Azghandi, "Perceptual Coding of Narrowband Audio Signals," Thesis, 139 pp. (Apr. 2000).
Nelson, *The Data Compression Book*, "Huffman One Better: Arithmetic Coding," Chapter 5, pp. 123-165 (1992).
OPTX International, "OPTX Improves Technology-Based Training with Screen Watch™ 3.0. Versatile Screen Capture Software Adds High Color and Live Webcast Support," 1 p., document marked Feb. 15, 2001 [Downloaded from the World Wide Web on Sep. 22, 2005].
OPTX International, "OPTX International Marks One Year Anniversary of Screen Watch With Release of New 2.0 Version," 1 p., document marked May 16, 2000 [Downloaded from the World Wide Web on Sep. 22, 2005].
OPTX International, "New Screen Watch™ 4.0 Clikc and Stream™ Wizard from OPTX International Makes Workplace Communication Effortless," 1 p., document marked Sep. 24, 2001 [Downloaded from the World Wide Web on Sep. 22, 2005].
Palmer et al., "Shared Desktop: A Collaborative Tool for Sharing 3-D Applications Among Different Window Systems," *Digital Tech. Journal*, vol. 9, No. 3, pp. 42-49 (1997).
Printouts of FTP directories from http://ftp3.itu.ch, 8 pp. [Downloaded from the World Wide Web on Sep. 20, 2005].
Reader, "History of MPEG Video Compression—Ver. 4.0," 99 pp., document marked Dec. 16, 2003.
Schaar-Mitrea et al., "Hybrid Compresion of Video with Graphics in DTV Communication Systems," *IEEE Trans. on Consumer Electronics*, pp. 1007-1017 (2000).
Shamoon et al., "A Rapidly Adaptive Lossless Compression Algorithm for High Fidelity Audio Coding," IEEE Data Compression Conf., pp. 430-439 (Mar. 1994).
Sullivan et al., "The H.264/AVC Advanced Video Coding Standard: Overview and Introduction to the Fidelity Range Extensions," 21 pp. (Aug. 2004).
Techsmith Corporation, "Techsmith Camtasia Screen Recorder SDK," 2 pp. (2001).
Techsmith Corporation, "Camtasia Feature of the Week: Quick Capture," 2 pp., document dated Jan. 4, 2001 [Downloaded from the World Wide Web on May 9, 2002].
Techsmith Corporation, "Camtasia Screen Recorder SDK DLL API User Guide," Version 1.0, 66 pp. (2001).
Techsmith Corporation, "Camtasia v.3.0.1—README.TXT," 19 pp. (Jan. 2002).
Tu et al., "Context-Based Entropy Coding of Block Transform Coefficients for Image Compression," *IEEE Transactions on Image Processing*, vol. 11, No. 11, pp. 1271-1283 (Nov. 2002).
Wien et al., "16 Bit Adaptive Block Size Transforms," JVT-C107r1, 54 pp.
Wien, "Variable Block-Size Transforms for Hybrid Video Coding," Dissertation, 182 pp. (Feb. 2004).

Zhang, "Robust Decoding for Reduced Error Propagation of DC/AC Prediction Errors," 2001 Proceedings of Workshop and Exhibition on MPEG-4, 2001, 4 pages.

ITU-T Recommendation H.264, "Series H: Audiovisual and Multimedia Systems, Infrastructure of Audiovisual Services—Coding of Moving Video," International Telecommunication Union, pp. 1-262 (May 2003).

ITU-T Recommendation T.800, "Series T: Terminals for Telematic Services," International Telecommunication Union, pp. 1-194 (Aug. 2002).

ISO/IEC 14496-2, "Coding of Audio-Visual Object—Part 2: Visual," Third Edition, pp. 1-727, (Jun. 2004).

Malvar, "Fast Progressive Image Coding without Wavelets", IEEE Data Compression Conference, Snowbird, Utah, 10 pp. (Mar. 2000).

Costa et al., "Efficient Run-Length Encoding of Binary Sources with Unknown Statistics", Technical Report No. MSR-TR-2003-95, pp. 1-10, Microsoft Research, Microsoft Corporation (Dec. 2003).

Examiner's First Report dated Oct. 31, 2008, from Australian Patent Application No. 2006280178, 2 pp.

Examination Report dated Sep. 24, 2009, from New Zealand Patent Application No. 565593, 2 pp.

Examination Report and Notice of Acceptance of Complete Specification dated Mar. 22, 2010, from New Zealand Patent Application No. 565593, 1 pp.

First Office Action dated Apr. 10, 2009, from Chinese Patent Application No. 200680029296.3, 11 pp.

Notice of Acceptance dated Dec. 7, 2009, from Australian Patent Application No. 2006280178, 2 pp.

Notice of Rejection dated Oct. 28, 2010, from Japanese Patent Application No. 2008-526092, 6 pp.

Notice of the Third Office Action dated Apr. 26, 2010, from Chinese Patent Application No. 200680029296.3, 8 pp.

Official Decision of Grant dated Jun. 15, 2007, from Russian Patent Application No. 2008105032, 20 pp.

Second Office Action dated Dec. 4, 2009, from Chinese Patent Application No. 200680029296.3, 13 pp.

\* cited by examiner

| 0 | 1 | 2 | 3 |
| 4 | 5 | 6 | 7 |
| 8 | 9 | 10 | 11 |
| 12 | 13 | 14 | 15 |

| 0 | 1 |
| 2 | 3 |
| 4 | 5 |
| 6 | 7 |

| 0 | 1 |
| 2 | 3 |

If (mx == 0 and my == 0)
        dc_mode = Null predict
    Else if (mx == 0)
        dc_mode = Predict from top
    Else if (my == 0)
        dc_mode = Predict from left
    Else {
        diff_h = abs (D - L)    // luminance
        diff_v = abs (D - T)    // luminance
        If (chrominance channels are available) {
            diff_h = diff_h * scale +
    sum_over_chrominance_channels { abs (D - L) }
            diff_v = diff_v * scale +
    sum_over_chrominance_channels { abs (D - T) }
        }

If (diff_h * orient_weight < diff_v) {
            dc_mode = Predict from top
        }
        Else if (diff_v * orient_weight < diff_h) {
            dc_mode = Predict from left
        }
        Else {
            dc_mode = Predict from left and top
        }
    }

Where
    scale = 8 for YUV 420, 4 for YUV 422, 2 otherwise
    orient_weight = 4
```

Figure 11

1100
```
lowpass_DCAC_mode = Null predict

If ((DC_mode == Predict from top) && (quantizer_index
(current MB) == quantizer_index (top MB))) {
     lowpass_DCAC_mode = Predict from top
}
Else if ((DC_mode == Predict from left) &&
(quantizer_index (current MB) == quantizer_index (left
MB))) {
     lowpass_DCAC_mode = Predict from left
}
```

Figure 12

```
diff_h = abs(lowpass(4)) + abs(lowpass(8)) +
abs(lowpass(12))
diff_v = abs(lowpass(1)) + abs(lowpass(2)) +
abs(lowpass(3))

If (chrominance is present) {
    If (YUV 420) {
        diff_h = diff_h + abs(lowpass_U(2)) +
abs(lowpass_V(2))
        diff_v = diff_v + abs(lowpass_U(1)) +
abs(lowpass_V(1))
    }
    Else if (YUV 422) {
        diff_h = diff_ h + abs(lowpass_U(2)) +
abs(lowpass_V(2)) + abs(lowpass_U(6)) + abs(lowpass_V(6))
        diff_v = diff_v + abs(lowpass_U(1)) +
abs(lowpass_V(1)) + abs(lowpass_U(5)) + abs(lowpass_V(5))
    }
    Else {
        diff_h = diff_h + abs(lowpass_U(4)) +
abs(lowpass_V(4))
        diff_v = diff_v + abs(lowpass_U(1)) +
abs(lowpass_V(1))
    }
}

If (diff_h * orient_weight < diff_v) {
    highpass_DCAC_mode = Predict from top
}
Else if (diff_v * orient_weight < diff_h) {
    highpass_DCAC_mode = Predict from left
}
Else {
    highpass_DCAC_mode = Null predict
}
```

1200

1300

Software 1580 Implementing Predictive
Transform Coefficient Coding ns # PREDICTION OF TRANSFORM COEFFICIENTS FOR IMAGE COMPRESSION

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Block Transform-Based Coding

Transform coding is a compression technique used in many audio, image and video compression systems. Uncompressed digital image and video is typically represented or captured as samples of picture elements or colors at locations in an image or video frame arranged in a two-dimensional (2D) grid. This is referred to as a spatial-domain representation of the image or video. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling. Similarly, digital audio is typically represented as time-sampled audio signal stream. For example, a typical audio format consists of a stream of 16-bit amplitude samples of an audio signal taken at regular time intervals.

Traditionally, compression of video is performed by compressing the first image frame, and compressing differences between successive frames. This process is repeated periodically across the video sequence. Therefore, the compression of video is closely related to the compression of "still" images.

Uncompressed digital audio, image and video signals can consume considerable storage and transmission capacity. Transform coding reduces the size of digital audio, images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain, or of audio in the time domain.

More specifically, a typical block transform-based codec 100 shown in FIG. 1 divides the uncompressed digital image's pixels into fixed-size two dimensional blocks $(X_1, \ldots X_n)$, each block possibly overlapping with other blocks. A linear transform 120-121 that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized 130 (i.e., reduced in resolution, such as by dropping least significant bits of the coefficient values or otherwise mapping values in a higher resolution number set to a lower resolution), and also entropy or variable-length coded 130 into a compressed data stream. At decoding, the transform coefficients will inversely transform 170-171 to nearly reconstruct the original color/spatial sampled image/video signal (reconstructed blocks $\hat{X}_1, \ldots \hat{X}_n$).

The block transform 120-121 can be defined as a mathematical operation on a vector x of size N. Most often, the operation is a linear multiplication, producing the transform domain output y=Mx, M being the transform matrix. When the input data is arbitrarily long, it is segmented into N sized vectors and a block transform is applied to each segment. For the purpose of data compression, reversible block transforms are chosen. In other words, the matrix M is invertible. In multiple dimensions (e.g., for image and video), block transforms are typically implemented as separable operations. The matrix multiplication is applied separably along each dimension of the data (i.e., both rows and columns).

For compression, the transform coefficients (components of vector y) may be selectively quantized (i.e., reduced in resolution, such as by dropping least significant bits of the coefficient values or otherwise mapping values in a higher resolution number set to a lower resolution), and also entropy or variable-length coded into a compressed data stream.

At decoding in the decoder 150, the inverse of these operations (dequantization/entropy decoding 160 and inverse block transform 170-171) are applied on the decoder 150 side, as show in FIG. 1. While reconstructing the data, the inverse matrix $M^1$ (inverse transform 170-171) is applied as a multiplier to the transform domain data. When applied to the transform domain data, the inverse transform nearly reconstructs the original time-domain or spatial-domain digital media.

In many block transform-based coding applications, the transform is desirably reversible to support both lossy and lossless compression depending on the quantization factor. With no quantization (generally represented as a quantization factor of 1) for example, a codec utilizing a reversible transform can exactly reproduce the input data at decoding. However, the requirement of reversibility in these applications constrains the choice of transforms upon which the codec can be designed.

Many image and video compression systems, such as MPEG and Windows Media, among others, utilize transforms based on the Discrete Cosine Transform (DCT). The DCT is known to have favorable energy compaction properties that result in near-optimal data compression. In these compression systems, the inverse DCT (IDCT) is employed in the reconstruction loops in both the encoder and the decoder of the compression system for reconstructing individual image blocks.

Transform Coefficient Prediction

As just noted, block transforms commonly use the discrete cosine transform (DCT) or variants. At high levels of loss, block transforms suffer from visual artifacts due to annoying block discontinuities. A "lapped transform" technique, in which the transformation windows overlap, can be used to smooth reconstructions even under loss.

In both block and lapped transforms, long linear features oriented along the horizontal or vertical directions cause high transform values along the left or top edges of transform domain blocks. The left and top edges are often referred to as DCAC values. This name is because these are the coefficients that are DC in one direction and AC in the other. The top left position is called the DC value (DC in both directions).

Block transforms often show a correlation between blocks. It can be easily appreciated that the DC coefficients of adjacent blocks are correlated and tend to be close in a probabilistic sense. Less evident is the correlation between the corresponding DCAC coefficients of adjacent blocks. Notably, if a certain area of an image shows strong horizontal features (such as line or patterns), the transform coefficients which are DC in the horizontal direction and AC in the vertical direction show inter block numerical correlation as well.

The process of exploiting inter-block DC and DCAC continuity by forming a prediction for the DC and DCAC terms from neighboring blocks, and encoding prediction differences is commonly referred to as "DCAC prediction". This term also covers the decoder side processes of recovering the original (or approximate) DC & DCAC transform coefficients. The DCAC terms being predicted may be a subset of all DCAC terms, determined by the direction of prediction.

SUMMARY

A digital media coding and decoding technique and realization of the technique in a digital media codec described herein uses a transform coefficient prediction that takes into account a dominant directionality of the digital media data (e.g., an image with strong horizontal or vertical features), and further operates compatibly with a two-stage transform.

For DC and DCAC coefficients from an inner stage transform of a macroblock, the codec calculates and compares directionality metrics based on inner stage transform DC coefficients of neighboring macroblocks to determine dominant directionality. The determination of directional dominance can also take into account information from other channels (e.g., color or chrominance). In the absence of directional dominance, the DC coefficient of the macroblock is predicted from an average of DC coefficients of preceding neighbor macroblocks. Directional prediction may be skipped for the DCAC coefficients of the macroblock if the neighboring macroblock has a different quantizer. Alternatively, directional prediction of DCAC coefficients may be restricted to macroblock(s) that has(have) the same quantizer.

For DCAC coefficients from an outer stage transform of blocks within the macroblock, the codec calculates and compares directionality metrics based on the inner stage transform DCAC coefficients of the macroblock to detect dominant directionality. The determination of directional dominance can also take into account information from other channels (e.g., color or chrominance). This way the directional prediction determination for outer stage DCAC coefficients can be made solely based on information in the macroblock. If directional dominance is found, the outer stage DCAC coefficients of the blocks within the macroblock are predicted unidirectionally from the dominant direction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a diagram of a 4×4 transform block structure illustrating DC and DCAC coefficients.

FIG. 5 is a diagram of a 422 chroma low pass block structure of coefficients produced in an inner stage transform of the encoder of FIG. 3 for a YUV 4:2:2 color format.

FIG. 6 is a diagram of a 420 chroma low pass block structure of coefficients produced in an inner stage transform of the encoder of FIG. 3 for a YUV 4:2:0 color format image.

FIG. 10 is a pseudo-code listing of a DC prediction mode determination in the predictive transform coefficient coding in the encoder of FIG. 3 and decoder of FIG. 4.

FIG. 11 is a pseudo-code listing of a low pass DCAC prediction mode determination in the predictive transform coefficient coding in the encoder of FIG. 3 and decoder of FIG. 4.

FIG. 12 is a pseudo-code listing of a high pass DCAC prediction mode determination in the predictive transform coefficient coding in the encoder of FIG. 3 and decoder of FIG. 4.

DETAILED DESCRIPTION

The following description relates to coding and decoding techniques that provides an efficient coding/decoding of transform coefficients of a block transform-based codec based on coefficient prediction (referred to herein as "Predictive Transform Coefficient Coding"). The following description describes an example implementation of the technique in the context of a digital media compression system or codec. The digital media system codes digital media data in a compressed form for transmission or storage, and decodes the data for playback or other processing. For purposes of illustration, this exemplary compression system incorporating this predictive transform coefficient coding is an image or video compression system. Alternatively, the technique also can be incorporated into compression systems or codecs for other 2D data. The predictive transform coefficient coding technique does not require that the digital media compression system encodes the compressed digital media data in a particular coding format.

1. Encoder/Decoder

Figure 1:
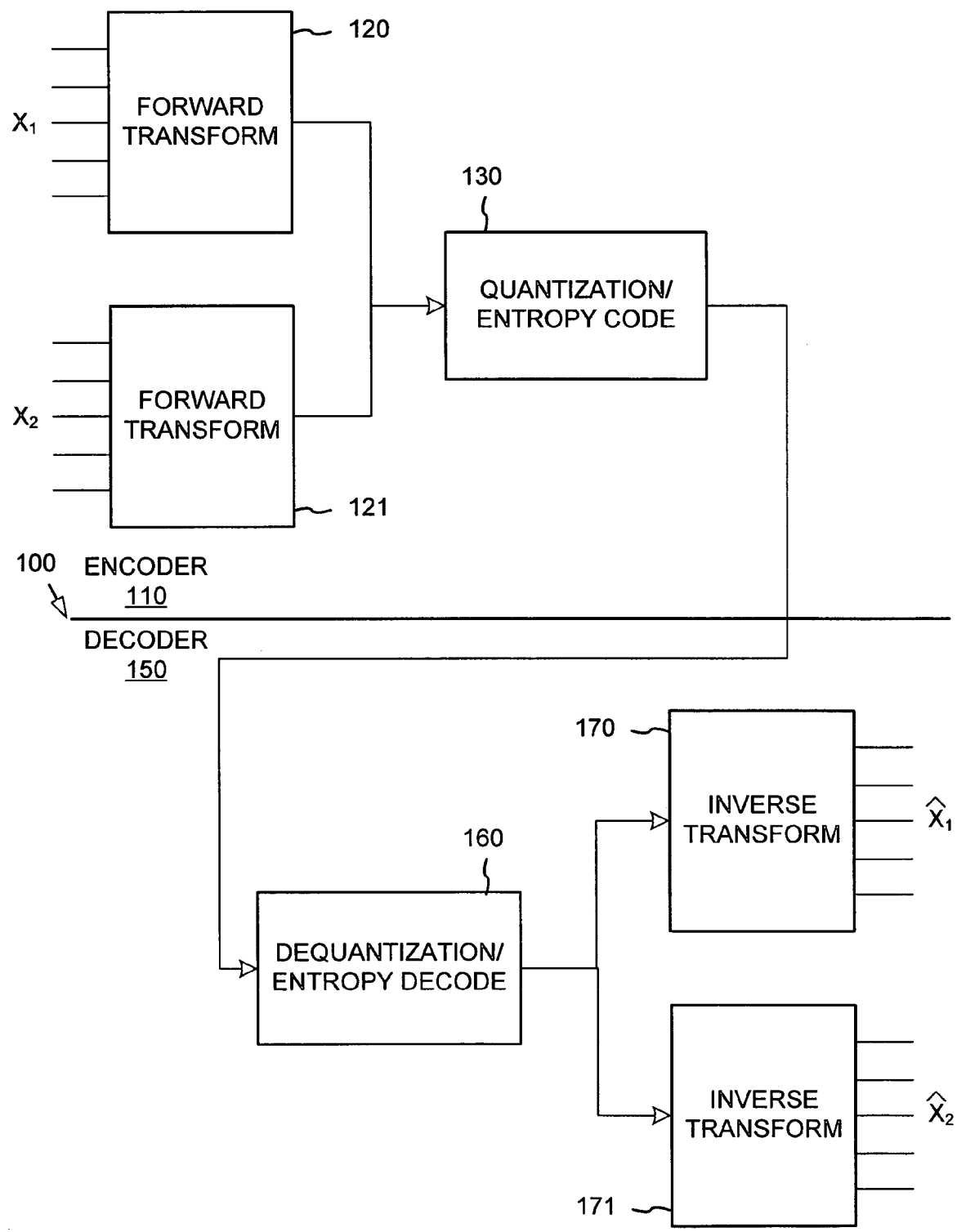
FIG. 1 is a block diagram of a conventional block transform-based codec in the prior art.
Figure 2:
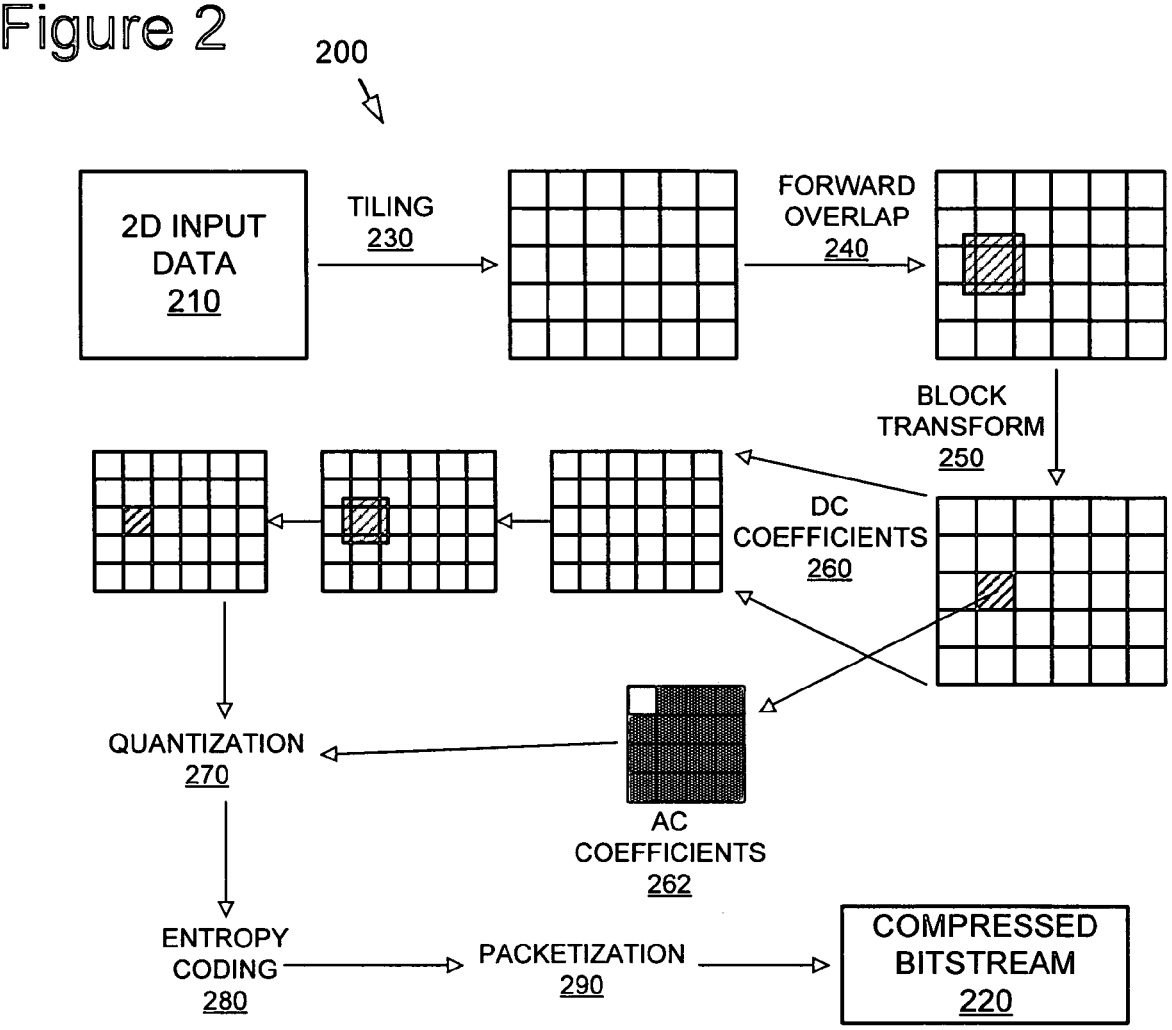
FIG. 2 is a flow diagram of a representative encoder incorporating a predictive transform coefficient coding.
Figure 3:
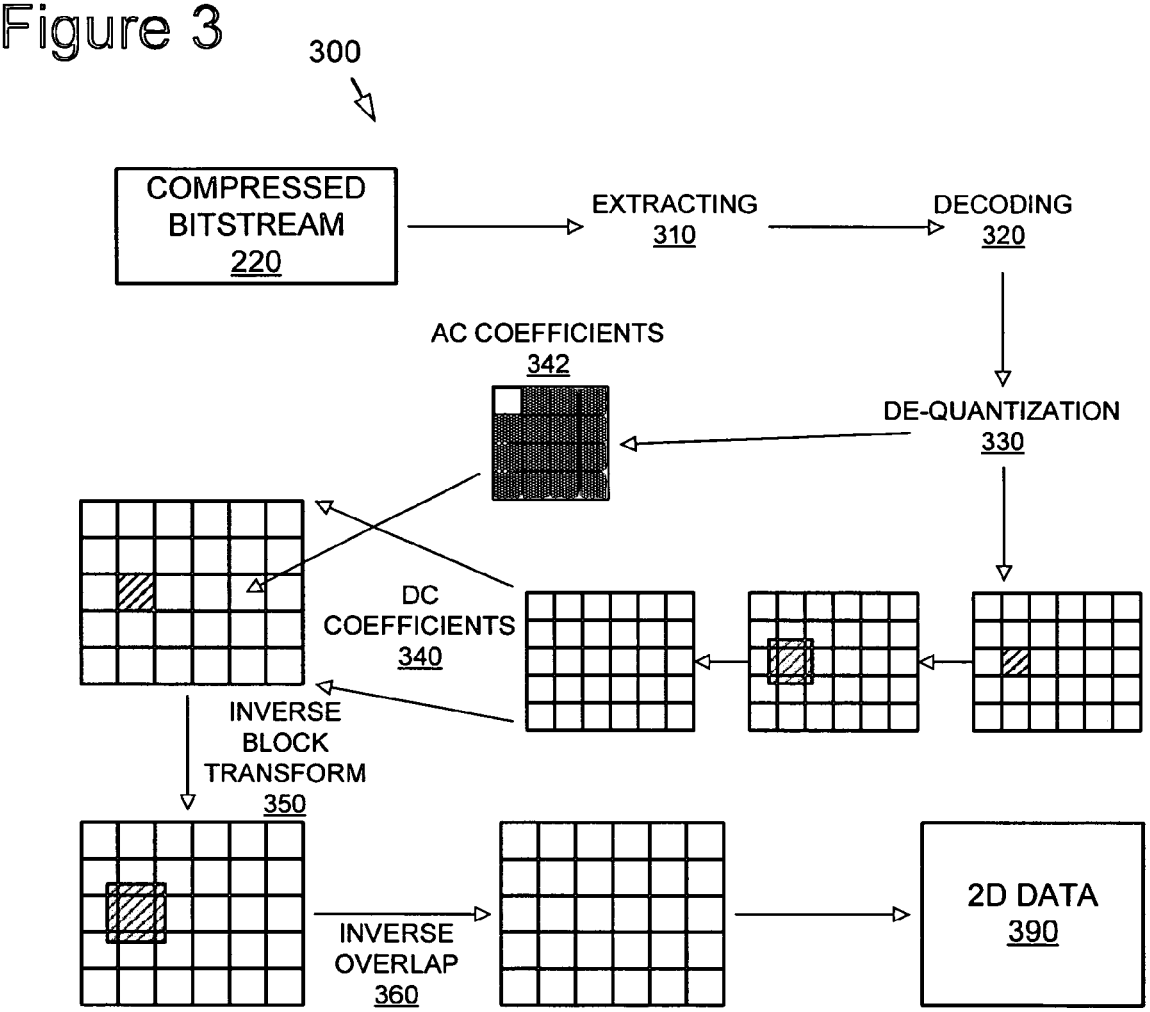
FIG. 3 is a flow diagram of a representative decoder incorporating the predictive transform coefficient coding.

FIGS. 2 and 3 are a generalized diagram of the processes employed in a representative 2-dimensional (2D) data encoder 200 and decoder 300. The diagrams present a generalized or simplified illustration of a compression system incorporating the 2D data encoder and decoder that implement the block pattern coding. In alternative compression systems using the block pattern coding, additional or fewer processes than those illustrated in this representative encoder and decoder can be used for the 2D data compression. For example, some encoders/decoders may also include color conversion, color formats, scalable coding, lossless coding, macroblock modes, etc. The compression system (encoder and decoder) can provide lossless and/or lossy compression of the 2D data, depending on the quantization which may be based on a quantization parameter varying from lossless to lossy.

The 2D data encoder 200 produces a compressed bitstream 220 that is a more compact representation (for typical input)

of 2D data 210 presented as input to the encoder. For example, the 2D data input can be an image, a frame of a video sequence, or other data having two dimensions. The 2D data encoder tiles 230 the input data into macroblocks, which are 16×16 pixels in size in this representative encoder. The 2D data encoder further tiles each macroblock into 4×4 blocks. A "forward overlap" operator 240 is applied to each edge between blocks, after which each 4×4 block is transformed using a block transform 250. This block transform 250 can be the reversible, scale-free 2D transform described by Srinivasan, U.S. patent application Ser. No. 11/015,707, entitled, "Reversible Transform For Lossy And Lossless 2-D Data Compression," filed Dec. 17, 2004. The overlap operator 240 can be the reversible overlap operator described by Tu et al., U.S. patent application Ser. No. 11/015,148, entitled, "Reversible Overlap Operator for Efficient Lossless Data Compression," filed Dec. 17, 2004; and by Tu et al., U.S. patent application Ser. No. 11/035,991, entitled, "Reversible 2-Dimensional Pre-/Post-Filtering For Lapped Biorthogonal Transform," filed Jan. 14, 2005. Alternatively, the discrete cosine transform or other block transforms and overlap operators can be used. Subsequent to the transform, the DC coefficient 260 of each 4×4 transform block is subject to a similar processing chain (tiling, forward overlap, followed by 4×4 block transform). The resulting DC transform coefficients and the AC transform coefficients are quantized 270, entropy coded 280 and packetized 290.

The decoder performs the reverse process. On the decoder side, the transform coefficient bits are extracted 310 from their respective packets, from which the coefficients are themselves decoded 320 and dequantized 330. The DC coefficients 340 are regenerated by applying an inverse transform, and the plane of DC coefficients is "inverse overlapped" using a suitable smoothing operator applied across the DC block edges. Subsequently, the entire data is regenerated by applying the 4×4 inverse transform 350 to the DC coefficients, and the AC coefficients 342 decoded from the bitstream. Finally, the block edges in the resulting image planes are inverse overlap filtered 360. This produces a reconstructed 2D data output.

In an exemplary implementation, the encoder 200 (FIG. 2) compresses an input image into the compressed bitstream 220 (e.g., a file), and the decoder 300 (FIG. 3) reconstructs the original input or an approximation thereof, based on whether lossless or lossy coding is employed. The process of encoding involves the application of a forward lapped transform (LT) discussed below, which is implemented with reversible 2-dimensional pre-/post-filtering also described more fully below. The decoding process involves the application of the inverse lapped transform (ILT) using the reversible 2-dimensional pre-/post-filtering.

The illustrated LT and the ILT are inverses of each other, in an exact sense, and therefore can be collectively referred to as a reversible lapped transform. As a reversible transform, the LT/ILT pair can be used for lossless image compression.

The input data 210 compressed by the illustrated encoder 200/decoder 300 can be images of various color formats (e.g., RGB/YUV4:4:4, YUV4:2:2 or YUV4:2:0 color image formats). Typically, the input image always has a luminance (Y) component. If it is a RGB/YUV4:4:4, YUV4:2:2 or YUV4:2:0 image, the image also has chrominance components, such as a U component and a V component. The separate color planes or components of the image can have different spatial resolutions. In case of an input image in the YUV 4:2:0 color format for example, the U and V components have half of the width and height of the Y component.

As discussed above, the encoder 200 tiles the input image or picture into macroblocks. In an exemplary implementation, the encoder 200 tiles the input image into 16×16 macroblocks in the Y channel (which may be 16×16, 16×8 or 8×8 areas in the U and V channels depending on the color format). Each macroblock color plane is tiled into 4×4 regions or blocks. Therefore, a macroblock is composed for the various color formats in the following manner for this exemplary encoder implementation:

1. For a grayscale image, each macroblock contains 16 4×4 luminance (Y) blocks.
 2. For a YUV4:2:0 format color image, each macroblock contains 16 4×4 Y blocks, and 4 each 4×4 chrominance (U and V) blocks.
 3. For a YUV4:2:2 format color image, each macroblock contains 16 4×4 Y blocks, and 8 each 4×4 chrominance (U and V) blocks.
 4. For a RGB or YUV4:4:4 color image, each macroblock contains 16 blocks each of Y, U and V channels.

FIGS. 4, 5 and 6 illustrate examples of various transform blocks in the representative encoder/decoder. FIG. 4 illustrates a 4×4 transform block for blocks in the luminance channel of the various formats, as well as the chrominance channels of a YUV 4:4:4 color format image. FIG. 5 shows a 422 chroma low pass block format, which contains the transform block coefficients from the inner stage transform of the chroma channel of a YUV 422 color format image. FIG. 6 shows a 420 chroma low pass block containing the coefficients from the inner stage transform of the chroma channel of a YUV 4:2:0 color format image.

With reference to FIG. 4, the following description uses a block transform convention or notation that is in line with matrix notation, with ordered basis functions. In the transform coefficient block 400 shown in FIG. 4 for example, the coefficient representing DC frequency is the first row/column of the transform coefficient block (labeled coefficient '0'), and that of the highest AC frequency is the last row/column (labeled coefficient '15'). Further, DCAC coefficients in the top row of the block (coefficients labeled '1,' '2' and '3' in FIG. 4) correspond to vertical line patterns, and DCAC values in the left column (coefficients labeled '4,' '8' and '12' in FIG. 4) correspond to horizontal line patterns. In actual practical implementation, the transform block may be transposed, in which case appropriate coefficient reindexing must be taken into account.

2. Predictive Transform Coefficient Coding Overview

As discussed briefly in the Background section above, DCAC prediction is a process for exploiting inter-block DC and DCAC continuity by forming a prediction for the DC and DCAC terms from neighboring blocks, and encoding prediction differences (as well as the inverse process on the decoder).

Figure 7:
FIG. 7 is a diagram illustrating an example of DCAC prediction.
Figure 8:
FIG. 8 is a diagram identifying the direction of prediction in the example DCAC prediction of FIG. 7.

With reference to FIGS. 7 and 8, an example of a DCAC prediction is shown. In this example, the DC coefficient ('0') and the DCAC coefficient set corresponding to either vertical patterns ('1,' '2,' and '3' ) or horizontal patterns ('4,' '8,' and '12') of each transform block are predicted from those of a preceding neighboring block. In other words, the corresponding coefficients of the neighboring block are taken as a "predictor" for those of the current block. The direction of prediction for each block in this example is identified in the diagram in FIG. 8 (with the notation 'N' indicating no prediction, 'L' indicating left prediction and 'T' indicating top prediction), as well as being illustrated by the arrows in the diagram of FIG. 7. When the direction of prediction is from the top, the coefficients '1', '2' and '3' are predicted from the corresponding coefficients in the block to the top. When the direction of prediction is from the left, the coefficients '4', '8' and '12' are predicted from the corresponding coefficients in the block to the left. Specifically, no prediction is used for the top left block. The second and third blocks of the top row are predicted from the block to their left. The blocks in the second row are predicted from above, left and above, respectively. With the DCAC prediction, the encoder encodes a coefficient as the difference from its predictor. If the prediction is reasonably accurate, the differences from the predictor will be zero with a high probability, which can be efficiently encoded with variable length entropy coding techniques (e.g., run length coding) at the entropy coding 280 (FIG. 2). For example, the variable length entropy coding technique described by Srinivasan, U.S. patent application Ser. No. TBD 11/203,008, entitled "Efficient Encoding and Decoding of Transform Blocks," filed Aug. 12, 2005.

The above representative encoder 200 (FIG. 2) and decoder 300 (FIG. 3) present certain challenges to use of DCAC prediction. First, the representative encoder and decoder use a 2-stage transform. These can be referred to as "outer" and "inner" stages, which correspond to the highpass and lowpass bands respectively. In particular, the DC coefficients 260 (FIG. 2) of the blocks are subjected to a second stage transform (the "inner" stage). As a result, the DC coefficients are not available to the decoder for decoding the other coefficients without first performing the inverse transform of that stage.

Second, the representative encoder and decoder use a lapped transform. By its design and construction, the lapped transform already implicitly extracts continuity across adjacent blocks. For this reason, the further application of DCAC prediction could end up degrading the coding performance (as compared to without DCAC prediction).

Third, for the purpose of minimizing memory footprint and complexity, it is desirable to keep inter-macroblock DCAC prediction to a minimum.

Finally, the representative encoder and decoder may apply different quantizers in different macroblocks, which further complicates the DCAC prediction.

The predictive transform coefficient coding techniques described herein provide various enhancements to the conventional DCAC prediction. In particular, an exemplary implementation of the predictive transform coefficient coding techniques described below addresses the above-listed issues using a unique set of prediction rules. In summary, these rules include:

1. The DC coefficients (of the inner transform) are predicted based on DC coefficients from causal neighboring blocks based at least in part on color information when available.
2. The DCAC coefficients of the inner transform use a prediction direction derived from that of the DC coefficients, and also rely on out-of-macroblock information.
3. The prediction of DCAC coefficients of the inner transform is skipped (i.e. 0 is used as the predictor) when the current and predicting macroblocks have different quantizers.
4. The prediction of DCAC coefficients of the outer transform is performed purely within the macroblock.
5. The prediction direction of the outer transform DCAC coefficients is derived from DCAC coefficients of the inner transform of the same macroblock.

In the description below, the predictive transform coefficient coding is described as being performed on the quantized transform coefficients (e.g., the transform coefficients after quantization 270 in the encoder 200 of FIG. 2, and before de-quantization 330 in the decoder 300 of FIG. 3). However, it should be understood that alternative implementations of the predictive transform coefficient coding technique could be performed on the unquantized transform coefficients (or on dequantized values on the decoder side).

The predictive transform coefficient coding in the representative encoder/decoder includes three levels of prediction that are detailed in the following sections. These include:

1. DC prediction, which is the prediction of DC coefficients of the inner transform,
2. Low pass DCAC prediction, which is the prediction of DCAC coefficients of the inner transform, and
3. High pass DCAC prediction, which is the prediction of DCAC coefficients of the outer transform.

2.1 DC Prediction

As described above, the representative encoder 200 (FIG. 2) tiles an image into macroblocks of 16×16 pixels, and further tiles the macroblocks into transform blocks of 4×4 pixels each. The outer stage transform is applied to the transform blocks, producing blocks containing 4×4 transform coefficients as shown in FIG. 4 (for the luminance channel, as well as the chrominance channels of a YUV 4:4:4 color format image). The DC coefficients in these 16 transform coefficient blocks of the macroblock are separated (forming a 4×4 block), and an inner stage of the transform is applied to this block. The resulting inner stage transform block again has 4×4 coefficients. The DC coefficient (labeled '0') of this inner stage transform block is referred to herein as the DC coefficient of the macroblock. The DCAC coefficients ('1,' '2,' '3,' '4,' '8,' and '12') of the inner stage transform block are referred to herein as the low pass DCAC coefficients of the macroblock. This macroblock structure can be varied in alternative encoders and decoder employing the predictive transform coefficient coding.

When encoding the coefficient of a macroblock, the predictive transform coefficient coding chooses from four modes for the prediction of the DC coefficient of the macroblock. These modes are:

1. Predict from left (i.e., the predictor for the DC coefficient of the macroblock is the DC coefficient of the macroblock to its left, or predictor=DC [left_MB]).
2. Predict from top (i.e., the predictor is the DC coefficient of the macroblock above it, predictor=DC [top_MB])
3. Predict from left and top (i.e., the predictor is an average of the DC coefficients of the macroblocks to its left and above, predictor=(DC [left_MB]+DC [top_MB])/2)
4. Null predict (i.e., no prediction, predictor=0)

The encoder determines which prediction mode to use for a macroblock according to the procedure illustrated by the pseudo-code listing 1000 in FIG. 10. In the listing 1000, the value $[m_x, m_y]$ is an index of the current macroblock in an image (or an image tile, if tiling is used) in terms of an offset number of macroblocks in horizontal (x) and vertical directions (y) starting from a top, left macroblock at [0,0].

In the illustrated procedure, the encoder determines which DC prediction mode is used based on the position of the macroblock within the image, as well as a consideration of the DC coefficients of the macroblocks to the left, top and top-left of the macroblock. More particularly, the encoder chooses the no prediction mode for the top-left macroblock of the image (i.e., the current macroblock $[m_x, m_y]=[0,0]$). The encoder chooses top prediction for macroblocks along a left edge in the image (i.e., where index ($m_x$) is 0). The encoder chooses left prediction for macroblocks in a top row of macroblocks in the image (i.e., where index ($m_y$) is 0).

Figure 9:
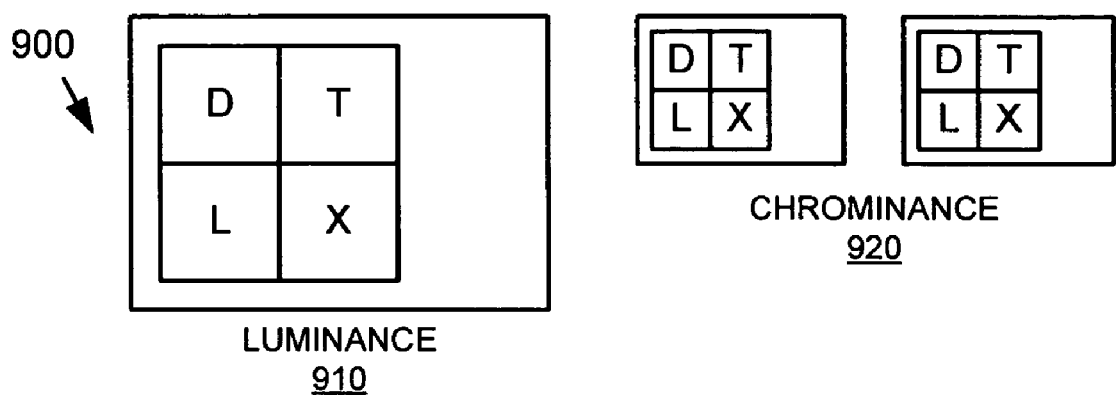
FIG. 9 is a diagram illustrating the macroblocks used in determining the DC prediction mode of a macroblock.

For all other (e.g., those in the interior of the image) macroblocks, the encoder determines which prediction mode to use based on a metric of dominant directionality. For example, an area of an image with horizontal stripes has a horizontal dominant directionality. In other words, the horizontal neighbor of the current macroblock is a better predictor of its DC coefficient, than its vertical neighbor. As illustrated in FIG. 9, this metric is calculated based on directional differences in DC coefficients of the current (X) macroblock's left (L) and top (T) neighbors from the current macroblock's diagonal neighbor (D). If the image has color or chrominance channels (e.g., for YUV color format images, but not grayscale images), the metric may further consider the DC coefficients of the corresponding macroblocks of the chrominance channels. In effect, the procedure determines that there is a vertical dominant directionality if the diagonal neighbor's DC coefficient is substantially closer to that of the left neighbor. On the other hand, when the diagonal neighbor DC coefficient is substantially closer to that of the top neighbor, then the metric will show a horizontal dominant directionality. The metric determines the "dominancy" based on a weighting factor (orient_weight). In the illustrated procedure, this weighting factor is four. In other words, a direction is considered dominant when its directional difference is more than four times that of the other direction. However, the weighting factor is a parameter that can be set to a different value in alternative implementations.

In instances where there is neither horizontal or vertical dominancy, then the encoder picks the combined left and top prediction mode (#3 in the above list), where the predictor is an average of the DC coefficients of top and left macroblocks.

2.2 Low Pass DCAC Prediction

With reference again to FIGS. 2 and 4, the representative encoder 200 includes a second or inner stage transform, which is applied to the DC coefficients 260 (FIG. 2) from the outer stage transform. The DCAC coefficients (at locations '1,' '2,' '3,' '4,' '8' and '12') of the resulting coefficient block 400 (FIG. 4) are herein referred to as the low pass DCAC coefficients.

The representative encoder and decoder use three prediction modes for the prediction of the low pass DCAC coefficients from the inner stage transform of a macroblock. These modes include:

1. Predict from left (i.e., the predictor for the low pass DCAC coefficients of the macroblock is the corresponding DCAC coefficient of the macroblock to its left, or predictor=DCAC [left_MB])—in which case coefficients marked '4', '8' and '12' alone are predicted;
2. Predict from top (i.e., the predictor is the corresponding low pass DCAC coefficient of the macroblock above it, predictor=DCAC [top_MB])—in which case coefficients marked '1', '2' and '3' alone are predicted; and
3. Null predict (no predication, or predictor=0).

The encoder determines which prediction mode to use for a macroblock according to the procedure illustrated by the pseudo-code listing 1100 in FIG. 11. In the illustrated procedure, the encoder determines which low pass DCAC prediction mode is used based on the DC prediction mode of the macroblock, together with the quantizer indices of the current macroblock and macroblock that is the DC predictor. This rule ensures that the prediction of inner transform DCAC coefficients does not take place across macroblocks with different quantizers. Further, DCAC is predicted only if one direction is dominant, which is derived per the DC prediction mode procedure detailed above (i.e., the DC prediction mode is "predict from left" or "predict from top" when horizontal or vertical dominance is found).

With reference to FIG. 5, the DCAC prediction procedure for YUV 4:2:2 color format images has a special case for the low pass DCAC coefficient at position labeled '5' in the block. In the special case, the coefficient labeled '5' is predicted from the coefficient '1' when the DC prediction mode is "predict from top" regardless of the DCAC prediction mode.

2.2 High Pass DCAC Prediction

With reference again to FIG. 2, the prediction for high pass DCAC coefficients is complicated in the representative encoder/decoder due to the two stage transform. The high pass DCAC coefficients are those of the highpass transform coefficients 262 produced from the outer stage transform 250. Further, as previously noted, the prediction is performed after quantization 270 in the representative encoder, such that the prediction in the representative decoder also takes place at decoding 320 (FIG. 3) prior to the dequantization 330 (FIG. 3). At this point in the decoding process, the inverse inner stage transform has not yet been performed to reconstruct the DC coefficients of the outer stage transform blocks. Likewise, at entropy encoding 280, the representative encoder has already applied the inner stage transform to these DC coefficients 260 of the outer stage transform blocks, such that the outer stage DC coefficients 260 are no longer available without also performing the inverse inner stage transform. It is therefore undesirable to base high pass DCAC prediction on the DC coefficients 260 of the outer transform. Otherwise, the decoders would be constrained to have the same numerical accuracy. The encoders would be constrained to run a decoder loop (i.e., the inverse inner stage transform), which is not feasible for a codec operating on an "open-loop" basis. For these reasons, the representative encoder/decoder bases the high pass DCAC prediction coding only on the decoded quantized values prior to inverse transform.

The two stage transform of the representative encoder/decoder is advantageous in that some information about the nature of the current macroblock can already be known from the low pass transform coefficients, even before the high pass transform coefficients are decoded. This information is used to determine the directionality of prediction. The representative encoder/decoder uses a simple yet effective metric to determine the dominant directionality of the macroblock based only on the inner transform coefficients.

Figure 13:
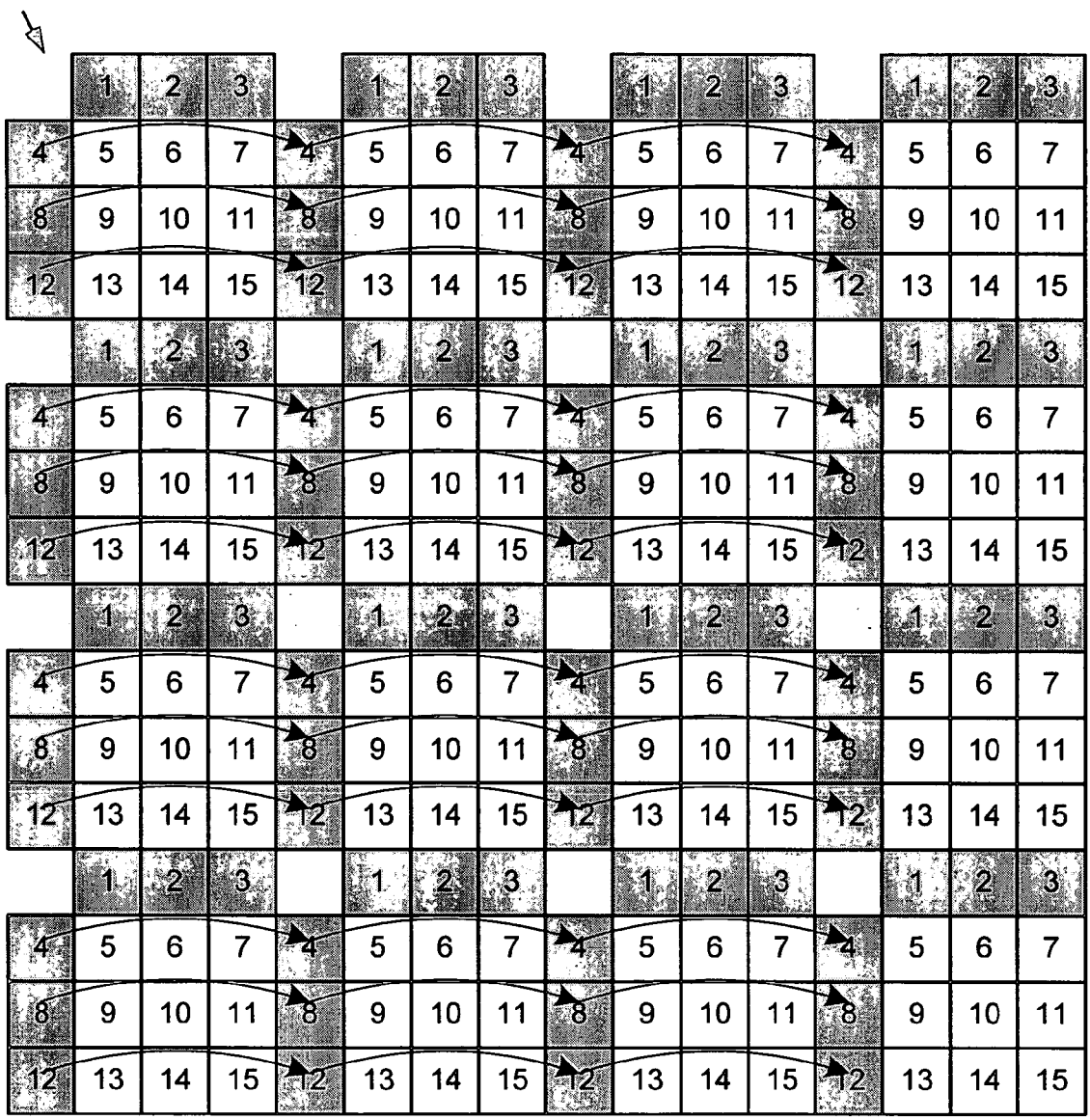
FIG. 13 is a diagram illustrating left high pass DCAC prediction of a macroblock.
Figure 14:
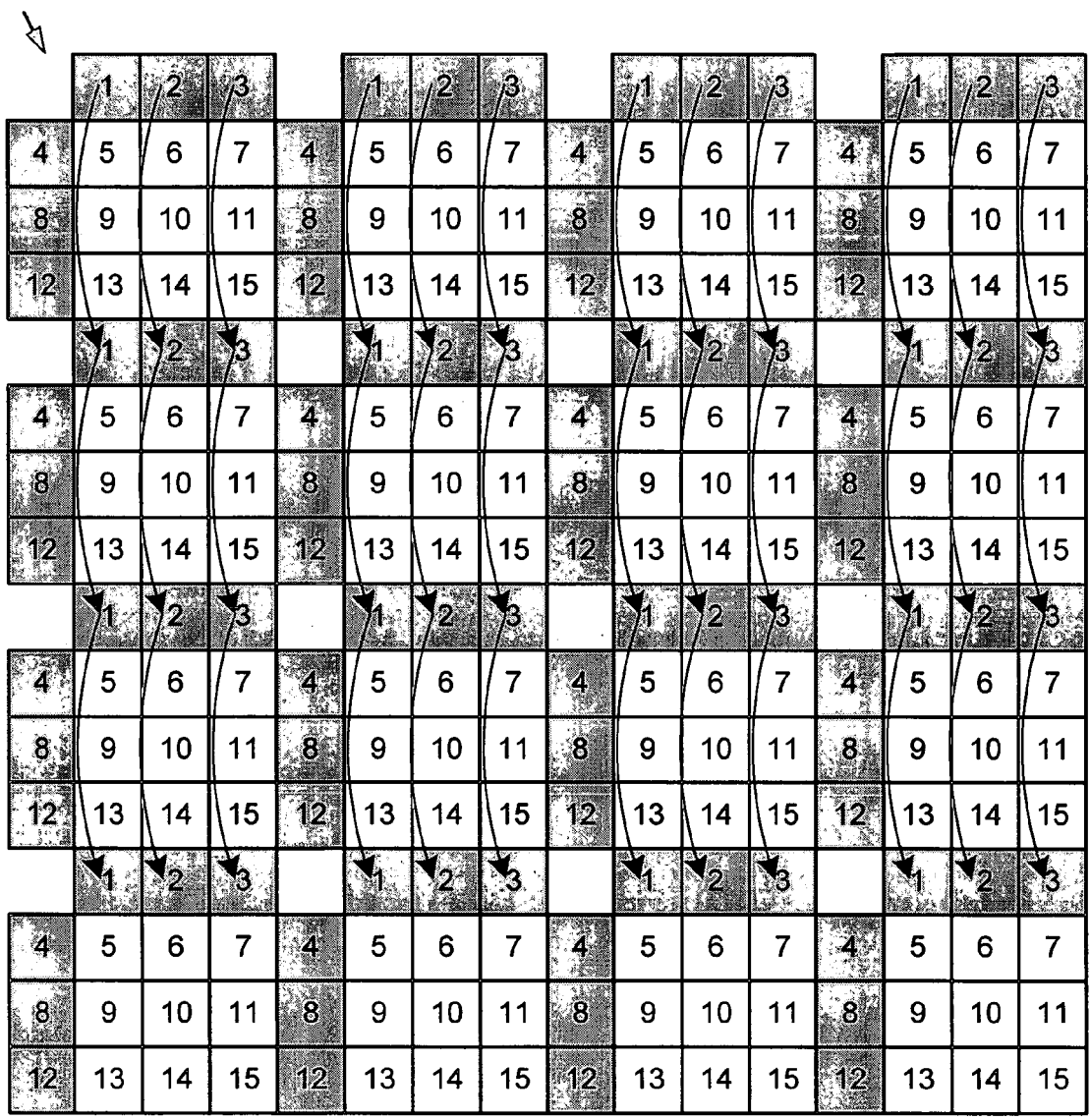
FIG. 14 is a diagram illustrating top high pass DCAC prediction of a macroblock.

The representative encoder and decoder use three prediction modes for the prediction of the high pass DCAC coefficients from the outer stage transform of a macroblock. These modes include:

1. Predict from left (i.e., the predictor for the high pass DCAC coefficient of the block is the correspondingly-located high pass DCAC coefficient of the block to its left, or predictor=DCAC [left_MB], as illustrated for left-predicted DCAC coefficients of macroblock 1300 in FIG. 13);
2. Predict from top (i.e., the predictor is the corresponding location, high pass DCAC coefficient of the block above it, predictor =DCAC [top_MB], as illustrated for top-predicted DCAC coefficients of macroblock 1400 in FIG. 14); and
3. Null predict (no predication, or predictor=0).

In the representative encoder/decoder, the same mode is applied to all blocks within a macroblock for which in-macroblock prediction is possible (but, alternative implementations need not apply the same mode to all blocks in a macroblock). In other words, no prediction is made for high pass DCAC coefficients of blocks that have no valid reference within the macroblock, even though the "predict from left" or "predict from top" mode is selected for the macroblock.

The encoder determines which prediction mode to use for a macroblock according to the procedure illustrated by the pseudo-code listing 1200 in FIG. 12. In this procedure, a weighting factor is again used to test directional dominance (similar to the DC prediction procedure 1000 of FIG. 10). The representative encoder and decoder use the value of the weighting factor for both procedures, but the same value parameter need not be used in both procedures in alternative implementations. The directional differences in the high pass DCAC prediction procedure 1200 are calculated based on the low pass DCAC coefficients from the inner stage transform of the macroblock, as well as the low pass DCAC coefficients from the chrominance channels (when present). In the pseudo-code listing 1200, the values "lowpass[i]" is the low pass DCAC coefficient at the corresponding index (i) position labeled in left-to-right, top-to-bottom order as in the block structure shown in FIG. 4. The values "lowpass_U[i]" and "lowpass_V[i]" are the low pass DCAC coefficients from the inner stage transform blocks of the U and V chrominance channels of a YUV color format image. These chrominance channels have coefficient indices as in the block structures 400, 500 and 600 shown in FIGS. 4, 5 and 6 for YUV 4:4:4, YUV 4:2:2 and YUV 4:2:0, respectively.

In the illustrated high pass DCAC prediction procedure, the only information that needs to be kept available from a macroblock for use in the prediction of neighboring macroblocks is one DC coefficient and 6 DCAC coefficients per macroblock channel (fewer for the chrominance channels of YUV 4:2:0 and YUV 4:2:2 color format images). This is at most 21 coefficients (in the YUV 4:4:4 case) that need to be cached per macroblock. Further, the coefficients used for prediction from the left can be discarded after the next macroblock is encoded/decoded. For YUV 4:4:4, it is therefore only necessary to cache 12 coefficients per macroblock for use in the next row of macroblocks.

When tiling is used by the encoder/decoder, each tile is deemed to be a separate image for the purpose of the predictive transform coefficient coding. This assures independent decoding of image tiles.

3. Computing Environment

The above described encoder 200 (FIG. 2) and decoder 300 (FIG. 3) and techniques for predictive transform coefficient coding can be performed on any of a variety of devices in which digital media signal processing is performed, including among other examples, computers; image and video recording, transmission and receiving equipment; portable video players; video conferencing; and etc. The digital media coding techniques can be implemented in hardware circuitry, as well as in digital media processing software executing within a computer or other computing environment, such as shown in FIG. 15.

Figure 15:
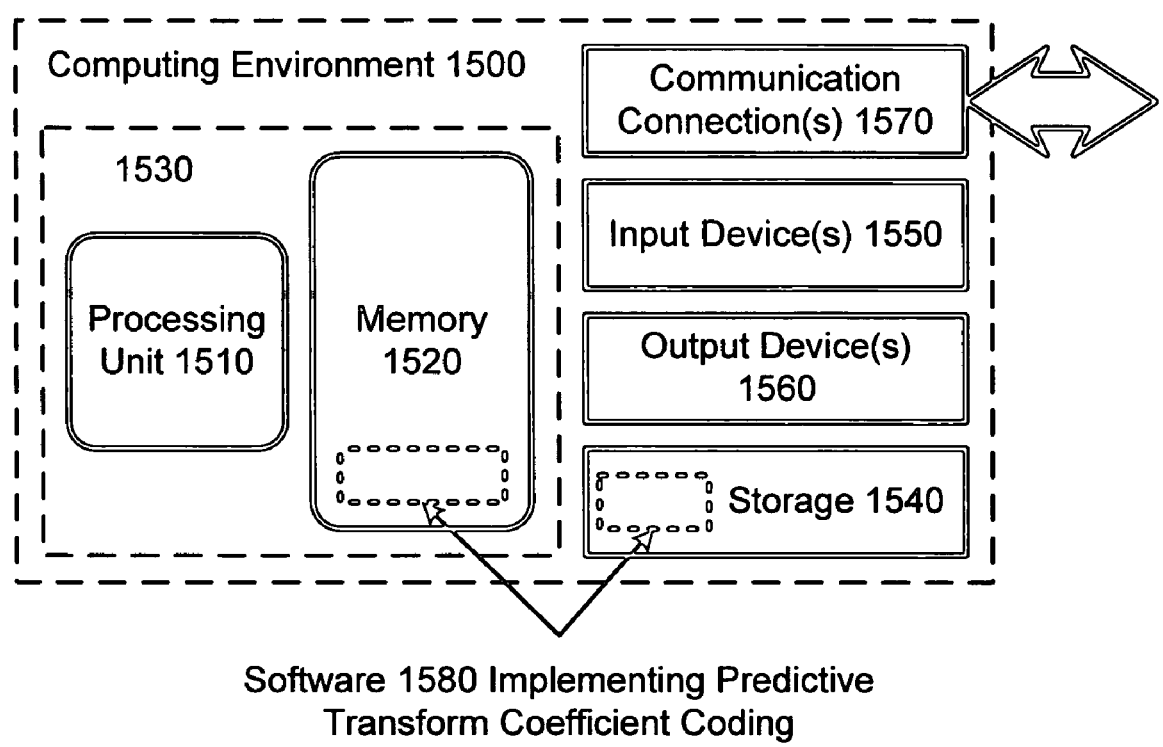
FIG. 15 is a block diagram of a suitable computing environment for implementing the adaptive coding of wide range coefficients of FIG. 4.

FIG. 15 illustrates a generalized example of a suitable computing environment (1300) in which described embodiments may be implemented. The computing environment (1300) is not intended to suggest any limitation as to scope of use or functionality of the invention, as the present invention may be implemented in diverse general-purpose or special-purpose computing environments.

With reference to FIG. 15, the computing environment (1300) includes at least one processing unit (1510) and memory (1520). In FIG. 15, this most basic configuration (1530) is included within a dashed line. The processing unit (1510) executes computer-executable instructions and may be a real or a virtual processor. In a multi-processing system, multiple processing units execute computer-executable instructions to increase processing power. The memory (1520) may be volatile memory (e.g., registers, cache, RAM), non-volatile memory (e.g., ROM, EEPROM, flash memory, etc.), or some combination of the two. The memory (1520) stores software (1580) implementing the described predictive transform coefficient coding techniques.

A computing environment may have additional features. For example, the computing environment (1500) includes storage (1540), one or more input devices (1550), one or more output devices (1560), and one or more communication connections (1570). An interconnection mechanism (not shown) such as a bus, controller, or network interconnects the components of the computing environment (1500). Typically, operating system software (not shown) provides an operating environment for other software executing in the computing environment (1500), and coordinates activities of the components of the computing environment (1500).

The storage (1540) may be removable or non-removable, and includes magnetic disks, magnetic tapes or cassettes, CD-ROMs, CD-RWs, DVDs, or any other medium which can be used to store information and which can be accessed within the computing environment (1500). The storage (1540) stores instructions for the software (1580) implementing the described encoder/decoder and predictive transform coefficient coding techniques.

The input device(s) (1550) may be a touch input device such as a keyboard, mouse, pen, or trackball, a voice input device, a scanning device, or another device that provides input to the computing environment (1500). For audio, the input device(s) (1550) may be a sound card or similar device that accepts audio input in analog or digital form, or a CD-ROM reader that provides audio samples to the computing environment. The output device(s) (1560) may be a display, printer, speaker, CD-writer, or another device that provides output from the computing environment (1500).

The communication connection(s) (1570) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The digital media processing techniques herein can be described in the general context of computer-readable media. Computer-readable media are any available media that can be accessed within a computing environment. By way of example, and not limitation, with the computing environment (1500), computer-readable media include memory (1520), storage (1540), communication media, and combinations of any of the above.

The digital media processing techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts

We claim:

1. A method of encoding digital media data using a predictive coding of transform coefficients, the digital media data comprising digital video or image data, the method comprising:
    applying a first stage transform to blocks in a current macroblock of the digital media data;
    grouping DC coefficients resulting from the first stage transform into a group of DC coefficients;
    applying a second stage transform to the group of DC coefficients to produce a set of transform coefficients for the current macroblock including a DC coefficient of the current macroblock;
    performing predictive coding of at least some of the transform coefficients, the predictive coding comprising:
        determining whether one of at least two directions of the digital media data in a locality of the current macroblock is dominant, wherein a direction is considered dominant when a directional difference for the direction is more than a weighting factor times that of another direction;
        when one of the at least two directions is determined to be dominant in the locality of the current macroblock, selecting a predictor of the DC coefficient of the current macroblock according to the determined dominant direction; and
        encoding the DC coefficient of the current macroblock relative to its predictor.

2. The method of claim 1 comprising:
    in a case that none of the at least two directions is determined to be dominant in the locality of the current macroblock, selecting the predictor of the DC coefficient of the current macroblock according to a combination of the at least two directions.

3. The method of claim 1 wherein the directions include at least horizontal and vertical.

4. The method of claim 1 wherein said determining whether one of at least two directions of the digital media data in a locality of a current macroblock is dominant comprises:
    calculating directional difference metrics for the at least two directions as a function of DC coefficients of preceding macroblocks in the at least two directions; and
    determining whether one of the at least two directions dominates based on the calculated directional differences.

5. The method of claim 4 wherein said calculating directional difference metrics comprises:
    calculating the directional difference metrics for the at least two directions as a function of the DC coefficients of the preceding macroblocks from plural channels of the digital media data in the at least two directions.

6. The method of claim 4 wherein the plural channels comprise a luminance channel and at least one chrominance channel.

7. The method of claim 1 wherein the set of transform coefficients for the current macroblock further comprises plural low pass coefficients for the current macroblock, the method further comprising:
    when one of the at least two directions is determined to be dominant in the locality of the current macroblock, selecting a predictor of at least one of the low pass coefficients of the current macroblock according to the determined dominant direction; and
    otherwise, encoding the low pass coefficients of the current block with no predictor.

8. The method of claim 7 further comprising, when selecting the predictor of the at least some of the low pass coefficients of the current macroblock when one of the at least two directions is determined to be dominant:
    determining whether a preceding macroblock containing the predictor selected according to the determined dominant direction has a same quantizer as the current macroblock; and
    if not, encoding the low pass coefficients of the current macroblock with no predictor.

9. The method of claim 1 wherein the first stage transform produces sets of first stage transform coefficients for the blocks in the current macroblock, wherein the first stage transform coefficients of a respective block in the current macroblock comprise plural first stage high pass coefficients from the first stage transform, the method further comprising:
    calculating directional difference metrics for the first stage high pass coefficients for the at least two directions as a function of second stage low pass coefficients produced from the second stage transform;
    determining whether one of at least two directions of the digital media data for the current macroblock is dominant for the first stage high pass coefficients based upon the calculated directional difference metrics for the first stage high pass coefficients;
    when one of the at least two directions is determined to be dominant for the first stage high pass coefficients for the current macroblock, selecting predictors of at least some of the first stage high pass coefficients according to the determined dominant direction;
    encoding the at least some of the first stage high pass coefficients relative to their predictors.

10. The method of claim 9 wherein said calculating directional difference metrics as a function of the second stage low pass coefficients comprises:
    calculating the directional difference metrics from plural channels of the digital media data.

11. The method of claim 10 wherein the plural channels comprise a luminance channel and at least one chrominance channel.

12. At least one computer-readable medium not consisting of a signal, the at least one computer-readable medium encoded with computer-executable instructions for causing a computer to perform a method of encoding digital media data using a predictive coding of transform coefficients, the digital media data comprising digital video or image data, the method comprising:
    applying a first stage transform to blocks in a current macroblock of the digital media data;
    grouping DC coefficients resulting from the first stage transform into a group of DC coefficients;
    applying a second stage transform to the group of DC coefficients to produce a set of transform coefficients for the current macroblock including a DC coefficient of the current macroblock;
    performing predictive coding of at least some of the transform coefficients, the predictive coding comprising:
        determining whether one of at least two directions of the digital media data in a locality of the current macroblock is dominant, wherein a direction is considered dominant when a directional difference for the direction is more than a weighting factor times that of another direction;

when one of the at least two directions is determined to be dominant in the locality of the current macroblock, selecting a predictor of the DC coefficient of the current macroblock according to the determined dominant direction; and encoding the DC coefficient of the current macroblock relative to its predictor.

13. A digital media encoder and/or decoder comprising:

a data storage buffer for storing digital media data to be encoded and/or decoded, the digital media data comprising digital video or image data;

a processor programmed to:

determine whether one of at least two directions of the digital media data for blocks within a current macroblock is dominant based upon coefficients produced from an inner stage transform, the inner stage transform being applied to a group of DC coefficients produced from an outer stage transform, the outer stage transform being applied to the blocks within the current macroblock;

when one of the at least two directions is determined to be dominant for the blocks within the current macroblock, select predictors of at least some of plural coefficients produced from the outer stage transform of the blocks within the current macroblock unidirectionally according to the determined dominant direction; and encode and/or decode the at least some of the coefficients produced from the outer stage transform of the blocks within the current macroblock relative to their predictors.

14. The digital media encoder and/or decoder of claim 13, wherein the processor is further programmed to:

determine whether one of at least two directions of the digital media data in a locality of the current macroblock is dominant for DC prediction based upon DC coefficients of preceding neighboring macroblocks, wherein a direction is considered dominant for DC prediction when its directional difference is more than a weighting factor times that of the other direction;

when one of the at least two directions is determined to be dominant for DC prediction in the locality of the current macroblock, select a predictor of the DC coefficient of the current macroblock according to the determined dominant direction, where the DC coefficient of the current macroblock is produced from the inner stage transform; and encode and/or decode the DC coefficient of the current macroblock relative to its predictor.

15. The digital media encoder and/or decoder of claim 14, wherein the processor is further programmed to:

when one of the at least two directions is determined to be dominant for DC prediction in the locality of the current macroblock and except when a quantizer of the current macroblock differs from that of a neighboring macroblock in a direction according to the determined dominant direction, select predictors of at least some of the coefficients of the current macroblock according to the determined dominant direction, where the coefficients of the current macroblock are produced from the inner stage transform; and encode and/or decode the at least some of the coefficients of the current macroblock relative to their predictors.

16. The digital media encoder and/or decoder of claim 15, wherein said determination of whether one of at least two directions is dominant for blocks within a current macroblock and for the locality of the macroblock is based upon the respective coefficients in plural channels of the digital media data, the plural channels comprising a luminance channel and at least one chrominance channel.

17. At least one computer-readable medium not consisting of a signal, the at least one computer-readable medium encoded with computer-executable instructions for causing a computer to perform a method of processing digital media data, the digital media data comprising digital video or image data, the method comprising:

calculating directional difference metrics for at least two directions of the digital media data for blocks within a current macroblock based upon coefficients produced from an inner stage transform, the inner stage transform being applied to a group of DC coefficients produced from an outer stage transform, the outer stage transform being applied to the blocks within the current macroblock;

determining based on the directional difference metrics whether one of the at least two directions of the digital media data for blocks within a current macroblock is dominant;

if one of the at least two directions is determined to be dominant for the blocks within the current macroblock, selecting predictors of at least some of plural coefficients produced from the outer stage transform of the blocks within the current macroblock unidirectionally according to the determined dominant directionality; and encoding or decoding the at least some of the coefficients produced from the outer stage transform of the blocks within the current macroblock relative to their predictors.

18. The at least one computer-readable medium of claim 17, wherein the method of processing digital media data further comprises:

calculating directional difference metrics for at least two directions of the digital media data in a locality of the current macroblock based upon DC coefficients of preceding neighboring macroblocks;

determining based on the calculated directional difference metrics for the locality of the current macroblock whether one of the at least two directions of the digital media data in the locality of the current macroblock is dominant for DC prediction;

if one of the at least two directions is determined to be dominant for DC prediction in the locality of the current macroblock, selecting a predictor of the DC coefficient of the current macroblock according to the determined dominant direction for DC prediction; and encoding or decoding the DC coefficient of the current macroblock relative to its predictor.

19. The at least one computer-readable medium of claim 18, wherein the method of processing digital media data further comprises:

if one of the at least two directions is determined to be dominant for DC prediction in the locality of the current macroblock and except when a quantizer of the current macroblock differs from that of a neighboring macroblock in a direction according to the determined dominant direction, selecting predictors of at least some of the coefficients of the current macroblock according to the determined dominant direction, where the coefficients of the current macroblock are produced from the inner stage transform; and encoding or decoding the at least some of the coefficients of the current macroblock relative to their predictors.

20. A method of decoding digital media data with an image decoder using a predictive coding of transform coefficients, the digital media data comprising digital video or image data, the method comprising:
   determining whether one of at least two directions of the digital media data in a locality of a current macroblock is dominant, wherein a direction is considered dominant when a directional difference for the direction is more than a weighting factor times that of another direction;
   when one of the at least two directions is determined to be dominant in the locality of the current macroblock, selecting a predictor of a DC coefficient of the current macroblock according to the determined dominant direction;
   decoding the DC coefficient of the current macroblock relative to its predictor;
   applying an inverse of a second stage transform to a set of second stage transform coefficients that includes the DC coefficient to produce a group of first stage DC coefficients; and
   applying an inverse of a first stage transform to sets of first stage transform coefficients for blocks of the current macroblock, each of the sets of first stage transform coefficients including a respective one of the first stage DC coefficients from the group of first stage DC coefficients.

21. The method of claim 20 comprising:
   in a case that none of the at least two directions is determined to be dominant in the locality of the current macroblock, selecting the predictor of the DC coefficient of the current macroblock according to a combination of the at least two directions.

22. The method of claim 20 wherein the directions include at least horizontal and vertical.

23. The method of claim 20 wherein said determining whether one of at least two directions of the digital media data in a locality of a current macroblock is dominant comprises:
   calculating directional difference metrics for the at least two directions as a function of DC coefficients of preceding macroblocks in the at least two directions; and
   determining whether one of the at least two directions dominates based on the calculated directional differences.

24. The method of claim 23 wherein said calculating directional difference metrics comprises:
   calculating the directional difference metrics for the at least two directions as a function of the DC coefficients of the preceding macroblocks from plural channels of the digital media data in the at least two directions.

25. The method of claim 24 wherein the plural channels comprise a luminance channel and at least one chrominance channel.

26. The method of claim 20 wherein the set of second stage transform coefficients for the current macroblock further comprises plural low pass coefficients for the current macroblock, the method further comprising:
   when one of the at least two directions is determined to be dominant in the locality of the current macroblock, selecting a predictor of at least some of the low pass coefficients of the current macroblock according to the determined dominant direction; and
   otherwise, decoding the low pass coefficients of the current block with no predictor.

27. The method of claim 26 further comprising, when selecting the predictor of the at least some of the low pass coefficients of the current macroblock when one of the at least two directions is determined to be dominant:
   determining whether a preceding macroblock containing the predictor selected according to the determined dominant direction has a same quantizer as the current macroblock; and
   if not, decoding the low pass coefficients of the current macroblock with no predictor.

28. The method of claim 20 wherein the first stage transform coefficients for a respective block in the current macroblock comprise plural first stage high pass coefficients, and wherein the set of second stage transform coefficients includes second stage low pass transform coefficients, the method further comprising:
   calculating directional difference metrics for the first stage high pass coefficients for the at least two directions as a function of the second stage low pass coefficients;
   determining whether one of the at least two directions is dominant for the first stage high pass coefficients based upon the calculated directional difference metrics for the first stage high pass coefficients;
   when one of the at least two directions is determined to be dominant for the first stage high pass coefficients, selecting predictors of at least some of the first stage high pass coefficients according to the determined dominant direction for the first stage high pass coefficients; and
   decoding the at least some of the first stage high pass coefficients relative to their predictors.

29. The method of claim 28 wherein said calculating directional difference metrics as a function of the second stage low pass coefficients comprises:
   calculating the directional difference metrics for the first stage high pass coefficients from plural channels of the digital media data.

30. The method of claim 29 wherein the plural channels comprise a luminance channel and at least one chrominance channel.

* * * * *

UNITED STATES PATENT AND TRADEMARK OFFICE
CERTIFICATE OF CORRECTION

PATENT NO. : 7,933,337 B2  
APPLICATION NO. : 11/203009  
DATED : April 26, 2011  
INVENTOR(S) : Sridhar Srinivasan et al.

It is certified that error appears in the above-identified patent and that said Letters Patent is hereby corrected as shown below:

In column 14, line 1, in Claim 7, delete "least one" and insert -- least some --, therefor.

In column 14, line 22, in Claim 9, after "first" delete ",".

Signed and Sealed this
Nineteenth Day of July, 2011

David J. Kappos
*Director of the United States Patent and Trademark Office*